United States Patent [19]

Koga et al.

[11] Patent Number: 5,290,321

[45] Date of Patent: Mar. 1, 1994

[54] PROCESS FOR PREPARATION OF GRANULAR μ-SULFUR HAVING IMPROVED FLOWABILITY, AS A VULCANIZING AGENT OF RUBBER COMPOSITION

[75] Inventors: Yukihiro Koga, Tadotsu; Tadahiko Matsuoka, Yoshino; Masatoshi Sasa, Marugame, all of Japan

[73] Assignee: Shikoku Chemicals Corporation, Marugame, Japan

[21] Appl. No.: 970,878

[22] Filed: Nov. 3, 1992

Related U.S. Application Data

[63] Continuation-in-part of Ser. No. 750,633, Aug. 27, 1991, abandoned.

[30] Foreign Application Priority Data

Aug. 28, 1990 [JP] Japan .................................. 2-227429
Mar. 30, 1991 [JP] Japan .................................. 3-92836

[51] Int. Cl.$^5$ .............................................. C01B 17/00
[52] U.S. Cl. .................................................. 23/293 S
[58] Field of Search .................. 23/293 S; 423/578 R, 423/578 A, 567 R; 424/705

[56] References Cited

U.S. PATENT DOCUMENTS

| | | |
|---|---|---|
| 1,771,293 | 7/1930 | Gluud . |
| 2,022,796 | 12/1935 | Wieder . |
| 2,195,870 | 4/1940 | Rosen . |
| 3,042,503 | 7/1962 | Tuller . |
| 4,326,875 | 4/1982 | Young . |

*Primary Examiner*—Christopher Henderson
*Attorney, Agent, or Firm*—Sherman and Shalloway

[57] ABSTRACT

An organic solvent alone or together with a rubber process oil is added to a powder of μ-sulfur, the mixture is granulated, and the granulation product is heated at a temperature lower than 120° C. to evaporate the organic solvent, whereby granular μ-sulfur having an improved flowability is obtained. This granular μ-sulfur is valuable as a rubber-vulcanizing agent.

6 Claims, No Drawings

PROCESS FOR PREPARATION OF GRANULAR μ-SULFUR HAVING IMPROVED FLOWABILITY, AS A VULCANIZING AGENT OF RUBBER COMPOSITION

This application is a continuation-in-part application of the U.S. application Ser. No. 07/750,633 filed on Aug. 27, 1991, which is now abandoned.

BACKGROUND OF THE INVENTION (1) Field of the Invention

The present invention relates to a process for the preparation of granular μ-sulfur having an improved flowability as a vulcanizing agent of rubber composition. According to the present invention, the workability at the rubber compounding operation can be improved and the rubber characteristics of the rubber composition can be improved at the vulcanizing step.

(2) Description of the Related Art

Sulfur has allotropies such as α-sulfur, β-sulfur and μ-sulfur. μ-sulfur is a brown liquid sulfur allotropy which is thermodynamically stable at a temperature of at least 119.0° C. physico-chemically. Usually, a commercially available or industrial product is a solid powder prepared by supercooling the liquid μ-sulfur by, for example, quenching. Such a commercially available μ-sulfur is generally a solid mixture of a supercooled μ-sulfur allotropy with a very small amount of α- to β-sulfur allotropies.

In the present invention, μ-sulfur is μ-sulfur powder as the above solid powder.

μ-sulfur is composed of molecules in which sulfur atoms are bonded like chains extending zigzag. It is a chain-like polymer having a molecular weight of 100,000 to 300,000, which is insoluble in carbon disulfide and rubbers.

In contrast, general sulfur is called α-sulfur and has an eight-membered molecular structure. It is soluble in carbon disulfide and rubbers, and clearly differs from μ-sulfur.

Since μ-sulfur has no blooming property at the time of compounding with a rubber, it is widely used in rubber tires.

In general, μ-sulfur is composed of fine particles having a particle size of about scores of microns or a smaller particle size, and during the handling, μ-sulfur is readily scattered in the form of dusts or in readily statically charged. Therefore, troubles such as fire are readily caused during the handling.

For overcoming this disadvantage, at least one rubber process oil selected from the group consisting of naphthenic oils, aromatic oils and paraffinic oils is incorporated in a powder of μ-sulfur and the μ-sulfur is used as so-called oil-processed μ-sulfur.

This oil-processed μ-sulfur is advantageous over unprocessed μ-sulfur in that scattering or occurrence of electrostatic troubles is controlled, but the oil-processed μ-sulfur is defective in that the flowability is poor and the sulfur adheres to various devices and meters during the handling. For examples, when the oil-processed μ-sulfur is measured by a meter and the oil-processed μ-sulfur is transferred to the next step, a part of the oil-processed μ-sulfur adheres to an inner wall of a vessel to reduce the precision of the measurement, with the result that the composition of rubber is changed and dispersion of the physical properties of the rubber composition is caused.

As the means for improving the flowability of μ-sulfur, there is known a method in which oil-processed μ-sulfur is granulated by compression molding.

This method, however, is defective in that the μ-sulfur agglomerates rigidly and when the μ-sulfur is kneaded with rubber, the granular μ-sulfur does not collapse to the original powdery state but is left as it is, and therefore, the dispersibility in rubber is reduced and the rubbery characteristics vary widely.

Japanese Unexamined Patent Publication No. 62-246810 teaches a method in which a dry powder of insoluble sulfur and a rubber process oil are mixed at a predetermined mixing ratio, the mixture is granulated and a dry powder of insoluble sulfur is spread on the granulation product. However, this method is defective in that when the mixing ratio of the rubber process oil is low, the powdery insoluble sulfur spread on the surface is scattered and as the amount added of the rubber process oil is increased, an adhesion trouble is caused.

SUMMARY OF THE INVENTION

It is a primary object of the present invention to solve the above-mentioned problem of the flowability of μ-sulfur, especially the problem of adhesion to the vessel wall, improve the dispersibility of μ-sulfur in rubber and provide a rubber composition having a reduced dispersion of the rubber characteristics.

In view of such circumstances, the present inventors repeated various tests and researches, and found that by adding a liquid organic compound or a mixture of the liquid organic compound and a rubber process oil to μ-sulfur powder as a binding agent, mixing and granulating them, and heating and drying the granulated mixture at a temperature of not more than 120° C., the flowability and the adhesion to a container wall can be drastically improved. Furthermore, since the resulting granular product has a moderate breaking strength, it is easily disintegrated in kneading with a rubber and the μ-sulfur returns to the original powder condition, and a rubber composition having good dispersibility in rubber and a small dispersion in the rubber properties. This had led to the present invention.

It has not been completely elucidated why the granular μ-sulfur prepared by the method of this invention has such a moderate granular particle bursting strength. Probably, it is assumed to be due to the following reasons.

A powder of μ-sulfur, excepting that it is produced by a special producing method or purified by a special method, contains a small amount of, usually about 2 to 4%, α- to β-sulfur without fail.

This co-existing α- to β-sulfur has a higher solubility in organic solvents than μ-sulfur. Therefore, by the existence of the aforesaid liquid organic compound, α- to β-sulfur component existing in the μ-sulfur powder particles, at least partly, exude in the phase of the liquid organic compound, and in the solution state fills the spaces between the particle surfaces of μ-sulfur.

When the granules in such a condition is heated and dried at a temperature of not more than 120° C., the organic compound component in the solution covering the μ-sulfur powder particles is gradially evaporated off by heating. The dissolved sulfur component is concentrated and finally forms a substance in which a very slight amount of liquid organic solvent is existent in a half-bonded condition in the sulfur component. This acts as a binder for the μ-sulfur particles. The so formed granular μ-sulfur has the above-mentioned moderate bursting strength, is easily disintegrated in kneading with a rubber, and returns to an original μ-sulfur powder.

For this reason, the granular μ-sulfur of this invention not only has excellent flowability, but also has good dispersibility in a rubber when it is kneaded with the rubber and can maintain stable properties of the rubber.

When a mixture of the above liquid organic compound and a rubber process oil is used as a binding agent, the product especially has excellent particle disintegrability of the granules.

DETAILED DESCRIPTION OF THE PREFERRED EMBODIMENTS

As typical examples of the organic solvent used for preparing granular insoluble sulfur of the present invention, there can be mentioned paraffinic hydrocarbon solvents such as n-hexane, halogenated hydrocarbon solvents such as teterachloromethane, alcohol solvents such as isopropyl alcohol, and aromatic hydrocarbons such as toluene. These solvents do not dissolve the starting μ-sulfur therein but can dissolve soluble α- or β-sulfur which is contained in a small amount in the starting μ-sulfur. Organic solvents having a boiling point lower than 120° C. are preferably used.

The organic solvent is used in such an amount that the starting μ-sulfur can be granulated. More specifically, the organic solvent is used in an amount of 0.3 to 0.7 liter per kg of the starting μ-sulfur. If the amount of the organic solvent used is smaller than 0.3 liter per kg of the starting μ-sulfur, granulation of the powdery μ-sulfur becomes difficult, and if the amount of the organic solvent used is larger than 0.7 liter per kg of the starting μ-sulfur, the product becomes creamy and no good results can be obtained.

Granulation of the starting sulfur powder is accomplished by adding the powder to an organic solvent ad mentioned above and stirring the mixture. A Henschel mixer, a super mixer or other high-speed mixer can be used as the mixing stirrer.

Then, the obtained granular product is heated at a temperature lower than 120° C. to evaporate the organic solvent. In the case where an organic solvent having a boiling point higher than 120° C. is used, heating should be conducted under a reduced pressure so that the temperature of the μ-sulfur is lower than 120° C. The lower limit of the heating temperature is not particularly critical, so far as the evaporation of the organic solvent is effectively accomplished. It is generally preferred that the heating temperature be higher than room temperature.

In an embodiment of the present invention where an organic solvent and a rubber process oil are added to the μ-sulfur, it is necessary that the organic solvent and the rubber process oil should be used in amounts of 0.2 to 0..6 liter and 0.01 to 0.30 kg, respectively, per kg of the insoluble sulfur.

At least one member selected from the group consisting of naphthenic, aromatic and paraffinic rubber process oils having a high boiling point is preferably used for carrying out the present invention.

The granular μ-sulfur obtained according to the present invention can be used as a vulcanizing agent for rubbers, such as natural rubber, butadiene rubber, synthetic isoprene rubber and chloroprene rubber, directly or after sieving or the like if necessary.

More specifically, in accordance with the present invention, there also is provided a particulate rubber vulcanizing agent comprising 96 to 98% by weight of μ-sulfur matrix fine particles and 4 to 2% by weight of soluble α- or β-sulfur, and if necessary, 0.01 to 0.30 Kg, per kg of the sum of the insoluble sulfur and the soluble sulfur, of a rubber process oil included in the particles, and having an average particle size of from 8 mesh to 60 mesh and a particle break strength lower than 30 g, wherein the heat stability TS, represented by the following formula, of the vulcanizing agent is at least 85%:

$$TS = \frac{W_1}{W_0 \times \frac{100 - W_2}{100}} \times 100 \quad (1)$$

wherein $W_0$ represents the weight (g) of the sample, $W_2$ represents the amount (% by weight) of the rubber process oil, and $W_1$ represents the amount (g) of the insoluble sulfur left when a test tube charged with 20 ml of mineral oil is immersed in an oil bath maintained at 105° C., 1.2 g of the sample is added into the test tube at the point when the oil temperature is elevated to 105° C., the test tube is heated for 15 minutes, the test tube is taken out from the oil bath, the test tube is rapidly cooled, the sample in the test tube is sufficiently washed with carbon disulfide to dissolve the soluble sulfur completely in carbon disulfide, and the residual solid is recovered by filtration and dried.

In the rubber composition of the present invention, the above-mentioned granular product composed of the μ-sulfur or the μ-sulfur and process oil should be incorporated into rubber in such an amount that the amount of the μ-sulfur is 0.5 to 10 parts by weight per 100 parts by weight of the rubber. If the amount added of the μ-sulfur exceeds the predetermined amount, the thermal aging property of the rubber is degraded, and if the amount added of the μ-sulfur is smaller than the predetermined amount, the rubber is not sufficiently cross-linked.

Since the μ-sulfur prepared according to the process of the present invention is a granular product having an appropriate particle break strength and when the μ-sulfur is incorporated into rubber, scattering of dust is not caused and the granular product does not adhere to the vessel wall, and therefore, the workability can be highly improved.

When the rubber composition of the present invention is kneaded, particles of the μ-sulfur readily collapse to a powdery state, and therefore, the dispersibility of the μ-sulfur in the rubber is very good, blooming is not caused and the dispersion of the rubber characteristics can be reduced.

EXAMPLES

The present invention will now be described in detail with reference to the following examples and comparative examples.

In the examples and comparative examples, the physical properties were determined according to the following methods.

Particle Break Strength

The sample is placed on an electronic balance and pressed by a glass rod, and the particle break strength is expressed by the value of the electronic balance read when the sample is broken.

Residual Adhering Amount

A stainless steel round-bottomed cylindrical vessel (having a diameter of 100 mm and a height of 60 mm), charged with 100 g of the sample, is attached to a shaking machine (Model SA-31 supplied by Yamato Kagaku), and the cylindrical vessel is shaken for 10 minutes at an amplitude of 30 mm and a frequency of 240 reciprocations per minute. The vessel is quietly detached from the shaking machine, and the vessel is inclined by 180° to naturally discharge the sample. The amount of the sample left in the vessel is measured.

Heat Stability

A test tube charged with 20 ml of mineral oil is immersed in an oil bath maintained at 105° C., and 1.2 g of the sample is added into the test tube at the point when the oil temperature is elevated to 105° C. The test tube is heated for 15 minutes. Then, the test tube is taken out from the oil bath and the test tube is rapidly cooled. The sample in the test tube is sufficiently washed with carbon disulfide to dissolve the soluble sulfur completely in carbon disulfide, and the residual solid is recovered by filtration and dried. The amount of the residual $\mu$-sulfur is measured, and the heat stability is calculated from this amount of the residual insoluble sulfur according to the above-mentioned formula (1).

Dispersibility of $\mu$-Sulfur in Rubber

Natural rubber (100 g) is wound on a roll maintained at 45° to 55° C., and predetermined amounts of insoluble sulfur and other additives are added to the rubber. The rolled sheet is folded back and roll passing is conducted 6 times. The obtained sheet is cut with a knife and the cut surface is visually examined to evaluate the dispersibility.

Blooming

The rubber composition prepared for the above-mentioned dispersibility test is passed through a roll heated at 100° C. for 5 minutes and is then allowed to stand still at room temperature. Occurrence of blooming is judged based on whether or not sulfur particles are precipitated on the surface of the composition.

Physical Properties of Vulcanized Product

An $\mu$-sulfur-incorporated rubber composition is press-cured at a temperature of 160° C. for 20 minutes and the test is carried out according to JIS K-6301. The hardness is determined by using a tester of type A of the same standard.

EXAMPLE 1

In a high-speed mixing machine (Spartan Ryuzer Model RMO-50H supplied by Fuji Powder) having a total volume of 70 liters, 10 kg of powdery $\mu$-sulfur having a purity of 97% and containing 0.2% of $\alpha$-methylstyrene (the same $\mu$-sulfur was used in the subsequent examples) was charged, and 6 liters of n-hexane was further charged while maintaining the revolution number of the main screw of the mixer at 2000 to 2500 rpm. Mixing with stirring was conducted for 10 minutes, and the obtained granular product was charged into a hot air drier set at a temperature of 70° C. and dried for 1 hour to evaporate n-hexane and shape all of the powder $\mu$-sulfur into a granular product.

The granular product was composed of uniform particles having a particle size of 0.5 mm, and the break strength was 8 to 25 g, the residue adhering amount was 2.5 to 7.0 g and the heat stability was 86.3%.

EXAMPLE 2

The same mixer as used in Example 1 was charged with 10 kg of powdery $\mu$-sulfur having a purity of 97%, and 1.1 kg of a rubber process oil composed of naphthenic, aromatic and paraffinic hydrocarbons (#310 supplied by Nippon San Sekiyu) was added to the powdery u-sulfur with stirring. Then, 4.5 liters of n-hexane was further added and mixing with stirring was conducted for 10 minutes. The obtained granular product was charged in a hot air drier set at a temperature of 70° C. and dried for 1 hour to obtain process oil-containing granular $\mu$-sulfur.

The granular product was composed of uniform particles containing 9.9% of the rubber process oil and having a particle size of about 0.5 mm, and the break strength was 5 to 25 g, the residue adhering amount was 3.0 to 8.0 g and the heat stability was 86.6%.

EXAMPLE 3

The same mixing machine as used in Example 1 was charged with 10 kg of powdery $\mu$-sulfur having a purity of 97%, and 6 liters of isopropyl alcohol was added thereto with stirring, and mixing with stirring was conducted for 10 minutes. The obtained granular product was charged in a hot air drier set at a temperature of 70° C. and dried for 1 hour to evaporate isopropyl alcohol and shape all of the powdery insoluble sulfur to a granular product.

The granular product was composed of uniform particles having a particle size of about 0.5 mm, and the break strength was 7 to 26 g, the residue adhering amount was 2.2 to 7.5 g and the heat stability was 86.0%.

EXAMPLE 4

The same mixing machine as used in Example 1 was charged with 10 kg of powdery $\mu$-sulfur having a purity of 97%, and 1.1 kg of the same rubber process oil as used in Example 2 was added thereto and 4.5 liters of isopropyl alcohol was further added. Mixing with stirring was conducted for 10 minutes, and the obtained granular product was charged in a hot air drier set at a temperature of 70° C. to evaporate isopropyl alcohol and obtain rubber process oil-containing granular $\mu$-sulfur.

The obtained granular product was composed of uniform particles containing containing 9.9% of the rubber process oil and having an average particle size of about 0.5 mm, and the break strength was 6 to 24 g, the residue adhering amount of 2.4 to 8.0 g and the heat stability was 86.6%.

COMPARATIVE EXAMPLE 1

A Lötige mixer having a volume of 300 liters was charged with 135 kg of powdery $\mu$-sulfur having a purity of 97% and 15 kg of the same rubber process oil as used in Example 2, and mixing with stirring was conducted for 10 minutes while maintaining the revolution number of the main screw at 115 rpm, but granular $\mu$-sulfur was not obtained. The resultant $\mu$-sulfur contained 10% of the rubber process oil, and the residual adhering amount was 60 to 90 g and the heat stability was 86.5%.

EXAMPLE 5

A rubber composition was prepared by uniformly kneading 100 parts by weight of natural rubber, 50 parts by weight of HAF carbon black, 5 parts by weight of zinc white, 2 parts by weight of stearic acid, 1 part by weight of phenyl-1-naphthylamine, 3 parts by weight of a rubber process oil, 0.5 part by weight of N-oxydiethylene-2-benzothiazole sulfanamide and 6 parts by weight of the granular μ-sulfur obtained in Example 1 by a roll mixer.

The obtained rubber composition was subjected to the evaluation tests. The obtained results are shown in Table 1.

EXAMPLE 6

A rubber composition was prepared in the same manner as described in Example 5 except that the granular μ-sulfur obtained in Example 2 was used instead of the granular μ-sulfur obtained in Example 1. The rubber composition was subjected to the evaluation tests. The obtained results are shown in Table 1.

COMPARATIVE EXAMPLE 2

A rubber composition was prepared in the same manner as described in Example 5 except that the same powdery μ-sulfur (having a residual adhering amount of 60 to 90 g) as obtained in Comparative Example 1 was used instead of the granular μ-sulfur obtained in Example 1. The rubber composition was subjected to the evaluation tests. The obtained results are shown in Table 1.

COMPARATIVE EXAMPLE 3

A rubber composition was prepared in the same manner as described in Example 3 except that granular μ-sulfur (having a break strength of at least 100 g and a residual adhering amount of 1.0 to 5.0 g) obtained by compression-molding powdery μ-sulfur containing 10% of a rubber process oil under a pressure of 70 to 80 kg/cm$^2$ by using a roller compacter was used as the μ-sulfur. The rubber composition was subjected to the evaluation tests. The obtained results are shown in Table 1.

We claim:

1. A process for the preparation of granular μ-sulfur, comprising the steps of:

adding a liquid organic compound having a boiling point lower than 120° C. as a binding agent to a powder of μ-sulfur in an amount of 0.3 to 0.7 liter of the liquid organic compound per kg of the powder of μ-sulfur, mixing the powder with the binding agent, granulating the mixture and drying the granulated mixture by heating at a temperature lower than 120° C. to form the granular μ-sulfur.

2. A process for the preparation of granular μ-sulfur according to claim 1, wherein the liquid organic compound is a compound selected from the group consisting of n-hexane, tetrachloromethane, isopropyl alcohol and toluene.

3. A process for the preparation of granular μ-sulfur, comprising the steps of:

adding a liquid organic compound having a boiling point lower than 120° C. and a rubber process oil as binding agents to a powder of μ-sulfur in an amount of 0.2 to 0.6 liter of the liquid organic compound and 0.01 to 0.3 kg of the rubber process oil, respectively, per kg of the powder of μ-sulfur, mixing the powder with the binding agents, granulating the mixture, and drying the granulated mixture by heating at a temperature lower than 120° C. to form the granular μ-sulfur.

4. A process for the preparation of granular μ-sulfur according to claim 3, wherein the liquid organic compound is a compound selected from the group consisting of n-hexane, tetrachloromethane, isopropyl alcohol and toluene.

5. A process for the preparation of granular μ-sulfur according to claim 1, which comprises adding n-hexane to a powder of μ-sulfur containing 2 to 4% by weight of α-sulfur and/or β-sulfur, in an amount of 0.3 to 0.7 liter of n-hexane per kg of the powder, mixing the powder with n-hexane, granulating the mixture and drying the granulated mixture by heating at a temperature ranging from higher than room temperature to 70° C. in a hot air drier to form the granular μ-sulfur having an average particle size of from 8 mesh to 60 mesh, a particle break strength of 5 to 25 g and heat stability TS, represented by the following formula, of at least 85%, $$TS = \frac{W_1}{W_0 \times \frac{100 - W_2}{100}} \times 100 \quad (1)$$

wherein $W_0$ represents the weight (g) of the sample, $W_2$ represents the amount (% by weight) of the rubber process oil, and $W_1$ represents the amount (g) of the insoluble sulfur left when a test tube charged with 20 ml of mineral oil is immersed in an oil bath maintained at 105° C., 1.2 g of the sample is added into the test tube at the point when the oil temperature is elevated to 105° C., the test tube is heated for 15 minutes, the test tube is taken out from the oil bath, the test tube is rapidly cooled, the sample in the test tube is sufficiently washed with carbon disulfide to dissolve the soluble sulfur completely in carbon disulfide, and the residual solid is recovered by filtration and dried.

6. A process for the preparation of granular μ-sulfur according to claim 4, which comprises adding n-hexane and a rubber process oil to a powder of μ-sulfur containing 2 to 4% of α-sulfur and/or β-sulfur, in an amount of 0.2 to 0.6 liter of n-hexane and 0.01 to 0.3 kg of the rubber process oil, respectively, per kg of the powder, mixing the powder with n-hexane and the process oil, granulating the mixture and drying the granulated mixture by heating at a temperature ranging from higher than room temperature to 70° C. in a hot air drier to form the granular sulfur having an average particle size of from 8 mesh to 60 mesh, a particle break strength of 5 to 25 g and heat stability TS, represented by the following formula, of at least 85%, $$TS = \frac{W_1}{W_0 \times \frac{100 - W_2}{100}} \times 100 \quad (1)$$

wherein $W_0$ represents the weight (g) of the sample, $W_2$ represents the amount (% by weight) of the rubber process oil, and $W_1$ represents the amount (g) of the insoluble sulfur left when a test tube charged with 20 ml of mineral oil is immersed in an oil bath maintained at 105° C., 1.2 g of the sample is added into the test tube at the point when the oil temperature is elevated to 105° C., the test tube is heated for 15 minutes, the test tube is taken out from the oil bath, the test tube is sufficiently washed with carbon disulfide to dissolve the soluble sulfur completely in carbon disulfide, and the residual solid is recovered by filtration and dried.

* * * * *